(12) United States Patent
Matsuoto et al.

(10) Patent No.: US 6,574,434 B2
(45) Date of Patent: Jun. 3, 2003

(54) WATER-PROOF STRUCTURE OF CAMERA

(75) Inventors: Hideaki Matsuoto, Fuchu (JP); Toshifumi Nakano, Sagamihara (JP); Takashi Muroi, Higashiyamato (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/021,725

(22) Filed: Dec. 12, 2001

(65) Prior Publication Data
US 2002/0085841 A1 Jul. 4, 2002

(30) Foreign Application Priority Data

Dec. 28, 2000 (JP) .................................. 2000-402879

(51) Int. Cl.⁷ .............................................. G03B 17/08
(52) U.S. Cl. ......................................... 396/29; 348/81
(58) Field of Search ............................... 396/29; 348/81

(56) References Cited

U.S. PATENT DOCUMENTS 6,002,884 A * 12/1999 Okumura et al. ............. 396/25

FOREIGN PATENT DOCUMENTS

| JP | 6-242497 A | 9/1994 |
|---|---|---|
| JP | 2000-122146 A | 4/2000 |

* cited by examiner

Primary Examiner—David M. Gray

(57) ABSTRACT

In a camera to which the present invention is applied, a camera body having a pop-up ST unit attached thereto is sandwiched between front and back covers. A plugged rubber arranged inside the back cover is pressed by a front cover rib provided on the front cover in the state in which the front and back covers are joined to each other, whereby the front and back covers are kept liquid-tight to each other. Moreover, an ST rubber arranged on the periphery of the ST body is pressed by the front cover rib in the state in which the ST body is sandwiched between the front and back covers, whereby the front cover, the back cover, and the ST body are kept liquid-tight to one another. Simultaneously, the ST rubber is pressed by a cover rib provided on the back cover, whereby the back cover and the ST body are kept liquid-tight to each other. Thus, the water-proofing function can be secured among the three members, that is, the front cover, the back cover, and the ST body.

22 Claims, 13 Drawing Sheets

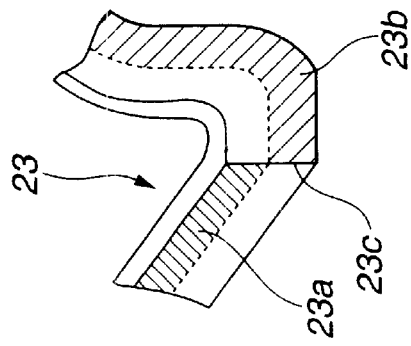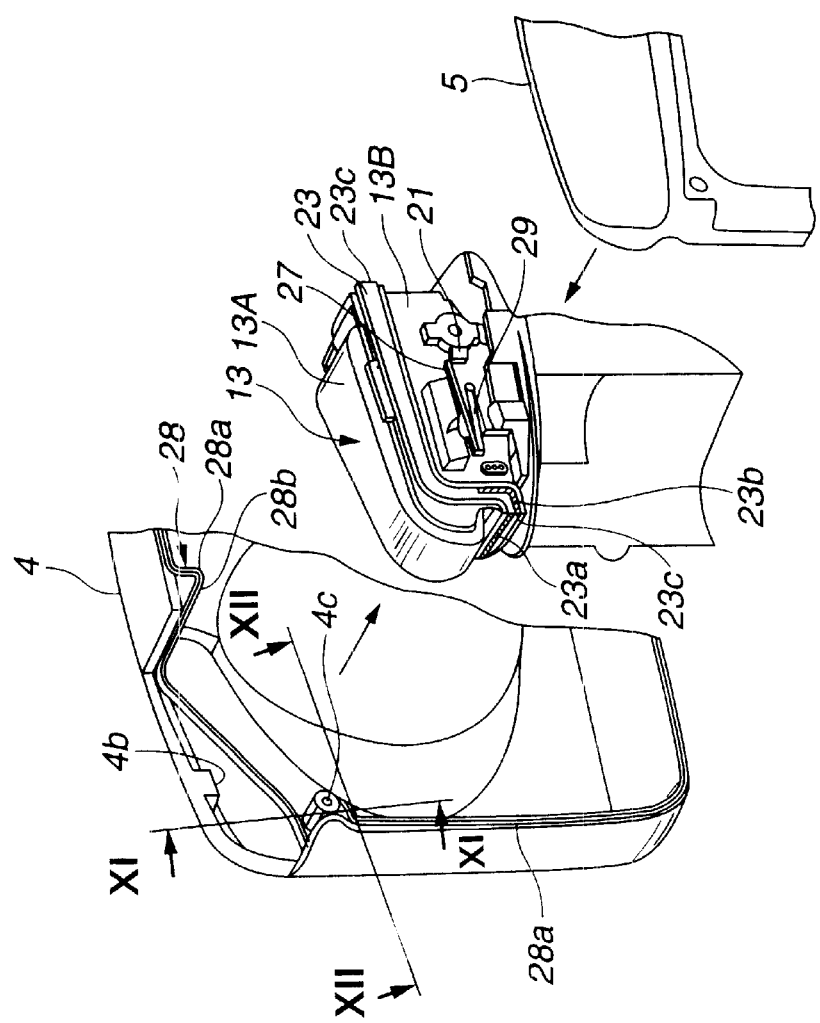

WATER-PROOF STRUCTURE OF CAMERA

This application claims the benefit of Japanese Application No. 2000-402879 filed in Japan on Dec. 28, 2000, the contents of which are incorporated herein by reference.

BACKGROUND OF THE INVENTION

1. Field of the Invention

The present invention relates to a water-proof structure of a camera and particularly to a water-proof structure of a camera containing a sandwiched member.

2. Related Art Statement

In recent years, a variety of small-sized cameras or the like have been proposed and practically applied which use roll films constructed so that a strobe light-emitting means such as a flashing device or the like is contained in a camera case.

Especially, cameras provided with a so-called pop-up strobe light-emitting means have been very popular. These cameras have a structure in which the strobe light-emitting means can be moved between an illumination position projected from the camera body and a non-illumination position in which the light-emitting means is retracted with respect to the camera body. The photographic and light-emitting performances are satisfactory, and the appearance of the camera bodies is advantageous from the standpoint of design and function.

To enhance the efficiency of assembly, reduce the manufacturing costs, and stabilize the photographic performance in the strobe light-emission mode of the above-described cameras, it has been much required to enhance the pop-up function and the water-proofing function necessary when the strobe light-emitting means is attached to the camera case.

In view of such requirements, a variety of suggestions have been made. For example, the applicant of the present invention discloses a pop-up strobe in Japanese Unexamined Patent Application Publication No. 6-242497 and moreover, a water-proofing mechanism provided in a movable unit of a camera in Japanese Unexamined Patent Application Publication No. 2000-122146.

According to the proposal in Japanese Unexamined Patent Application Publication No. 6-242497, a technique for a pop-up strobe is disclosed. In this technique, a load applied to the strobe body during retraction- and projection-operation is absorbed to enhance the pop-up function so that the strobe body can be projected or retracted safely and securely.

Moreover, according to the proposal in Japanese Unexamined Patent Application Publication No. 2000-122146, a technique for the water-proofing mechanism of a camera with a light-emitting unit is disclosed. In this technique, to enhance the water-proofing function necessary when the strobe light emitting means is attached to a camera case, a load caused by the movement for the retraction and projection of the light emitting unit or the like can be reduced without the size of the camera itself being increased.

Referring to the water-proofing functions of cameras provided with general strobe light-emitting means, in usual cases, such a camera comprises a camera body to which optical system members, electronic circuit components and so forth necessary for photographing are attached, and a front cover and a back cover which are external members used to sandwich the camera body, the front cover having a strobe light-emitting means attached thereto. The water-proofing function is provided on either one of the front cover and the back cover, and the function is attained by means of a water-proofing member arranged in the position corresponding to the joined portion of these members.

To water-proof the strobe light-emitting means, an adhesive or the like is applied to the attached portion of the strobe light-emitting means attached to the inside of the front cover.

Referring to the water-proofing function of the camera provided with the pop-up strobe light emitting means, according to the proposals described in Japanese Unexamined Patent Application Publication Nos. 6-242497 and 2000-122146, the strobe light-emitting means is attached to the front cover. The water-proofing function is attained between the front and back covers sandwiching the camera body. In this structure, connection for supplying electric power for illumination from the camera body to the strobe light-emitting means must be provided between the camera body and the front cover. Thus, the connection work is troublesome.

Moreover, a drive source for driving the pop-up of the strobe light-emitting means is provided on the camera body. Therefore, a drive-transmission mechanism also becomes complicated. Moreover, a test on driving of the pop-up or the like is made after the members are joined to each other, and required wiring and connection are made. Inconveniently, the test also becomes troublesome. That is, the techniques of the related art have a problem in that the efficiency of assembly can not be enhanced.

As a method most suitable to solve the described-above problems, desirably, the pop-up strobe light-emitting means is provided on the camera body. However, in this structure, water-proofing functions must be provided between the three members, that is, the front cover, the back cover, and the strobe light-emitting means attached to the camera body, which is difficult to be carried out. No concrete water-proofing mechanism useful to solve this problem has been proposed.

OBJECT AND SUMMARY OF THE INVENTION

Accordingly, it is an object of the present invention to provide a water-proof structure of a camera which enhances the efficiency of assembly and in which the water-proof function of the camera is performed securely among three members by use of two water-proofing members.

In brief, a water-proof structure of a camera in accordance with the present invention comprises a front cover covering the front side of a camera body, a back cover covering the back side of the camera body, a sandwiched member sandwiched between the front cover and the back cover, a first water-proofing member arranged on the back cover and pressed by a first protuberant strip provided on the front cover in the state in which the front cover and the back cover are joined to each other whereby the front cover and the back cover are kept liquid-tight to each other; and a second water-proofing member arranged on the sandwiched member, pressed by the first protuberant strip whereby the front cover and the sandwiched member are kept liquid-tight to each other, and moreover, pressed by a second protuberant strip provided on the back cover, whereby the back cover and the sandwiched member are kept liquid-tight to each other, in the state in which the sandwiched member is sandwiched between the front cover and the back cover. With this structure, the water-proofing function can be secured to keep the front cover, the back cover, and the sandwiched member water-tight to one another.

According to another aspect of the present invention, a water-proof structure of a camera comprises a first case having an open end for joining at one end thereof and a first protuberant strip provided on the open end, a second case joined to the first case, a sandwiched member sandwiched between the first and second cases, a first water-proofing member arranged on the second case pressed by the first protuberant strip in the state in which the first and second cases are joined to each other, and a second water-proofing member arranged on the sandwiched member pressed by the first protuberant strip and a second protuberant strip provided on the second case in the state in which the sandwiched member is sandwiched between the first and second cases. With this structure, the water-proofing function can be secured to keep the front cover, the back cover, and the sandwiched member water-tight to one another.

The object and advantages of the present invention will become further apparent from the following detailed explanation.

BRIEF DESCRIPTION OF THE DRAWINGS

FIG. 9A mainly illustrates the assembly and structure of a water-proofing means applied to the front cover, and shows the shapes of a front cover rib of the front cover and an ST rubber of the ST body;

FIG. 9B is an enlarged view showing the essential part of the ST rubber shown in FIG. 9A which is an characteristic of the present invention;

DESCRIPTION OF THE PREFERRED EMBODIMENTS

Hereinafter, embodiments of the present invention will be described with reference to the drawings.

Figure 1:
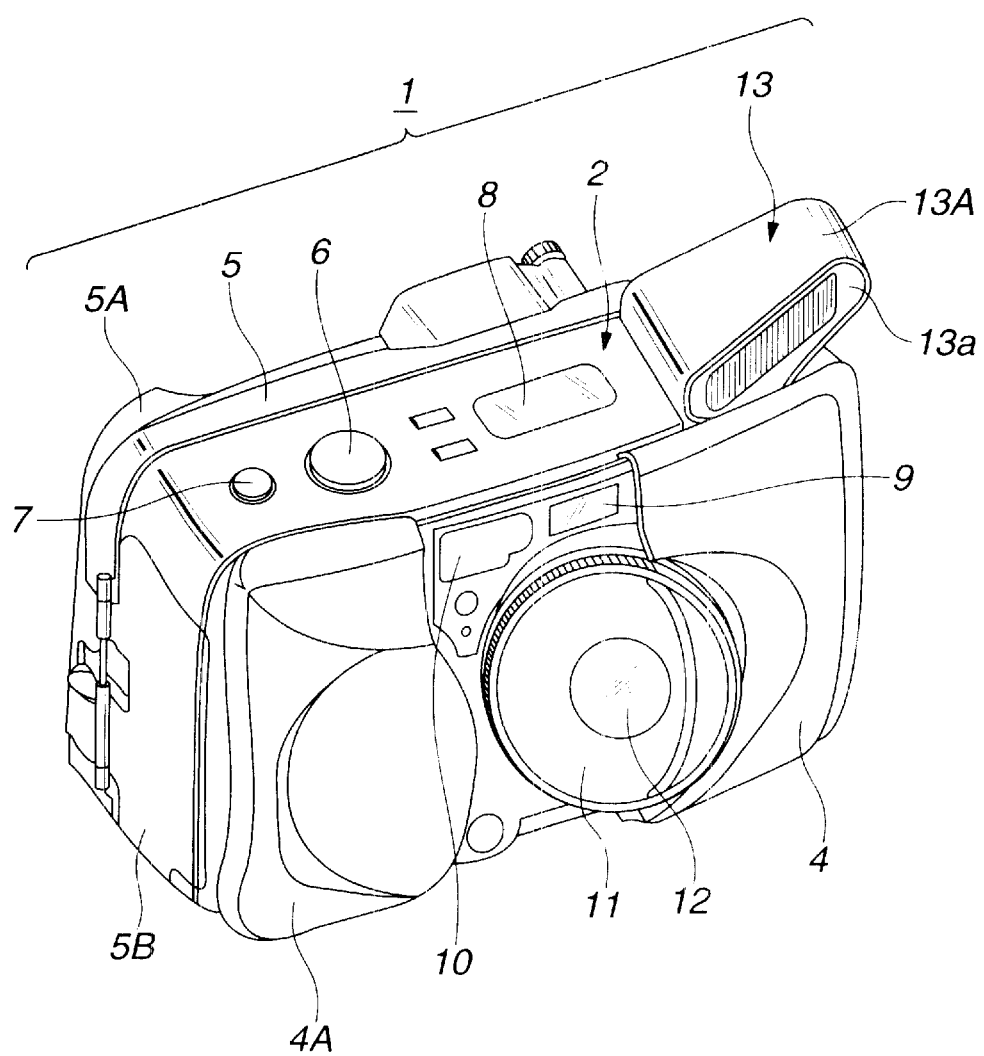
FIG. 1 shows a water-proof structure of a camera according to an embodiment of the present invention, and is a perspective view showing the appearance and constitution of a camera having the water-proof structure applied thereto and provided with a pop-up light-emitting means.

FIG. 1 shows an embodiment of the water-proof structure of a camera in accordance with the present invention, and is a perspective view showing the appearance and structure of the camera having a pop-up light-emitting means to which the water-proof structure is applied.

As shown in FIG. 1, in brief, a camera 1 to which the water-proof structure in accordance with the present invention is applied contains a front-side cover 4 (hereinafter, referred to as a front cover) as a first member and a back-side cover 5 (hereinafter, referred to as a back cover) as a second member which sandwich a camera body 3 (see FIG. 3) to which optical system members, electronic circuit components, and so forth necessary for photographing are attached, and a strobe unit 13 (hereinafter, referred to as an ST unit, briefly) as a strobe light-emitting means which is attached to the camera body 3. The front cover 4 and the back cover 5 forms a case 2 for the camera 1.

A release button 6, a zooming button 7, and an LCD indication portion 8 are arranged on the upper side of the front cover 4.

The release button 6 is a switching means applicable to be pushed down for execution of photographic operation. The zooming button 7 is operated by a user so that the magnification of the camera is set. The LCD indication portion 8, which comprises a LCD, for example, indicates the number of frames and other photographic information.

A barrier 4A is disposed on the front surface of the front cover 4 slidably to the right and left hand sides in the horizontal direction of the front cover 4. The barrier 4A, when the camera 1 is not used for photographing, e.g., when it is carried, stored or the like, is slid to the right hand side in FIG. 1 to cover and protect the components such as a finder window 10, a lens barrel 11, a photographic optical system 12, and so forth arranged on the front side of the camera 1.

A rangefinder window 9 is provided on the upper side of the front cover 4. A rangefinder means, not shown, is disposed inside the camera at a position corresponding to that of the rangefinder window 9. The distance of a photographic object to the camera is detected by the rangefinder means.

The finder window 10 is provided in the front upper part of the front cover 4. The lens barrel 11 is disposed in the front center of the front cover 4. The lens barrel 11 is formed so that the photographic optical system 12 for receiving light rays from an object at photographing can be held.

Moreover, a back-side lid 5A for covering a film-receiving room provided in the camera body 3 (see FIG. 3) is openably attached to the back cover 5 which, together with the front cover 4, sandwiches the camera body 3 to constitute the camera case 2.

A battery lid 5B is openably attached to one of the sides of the back cover 5 so as to cover the port of a battery room formed in the side portion of the front cover 4.

Figure 3:
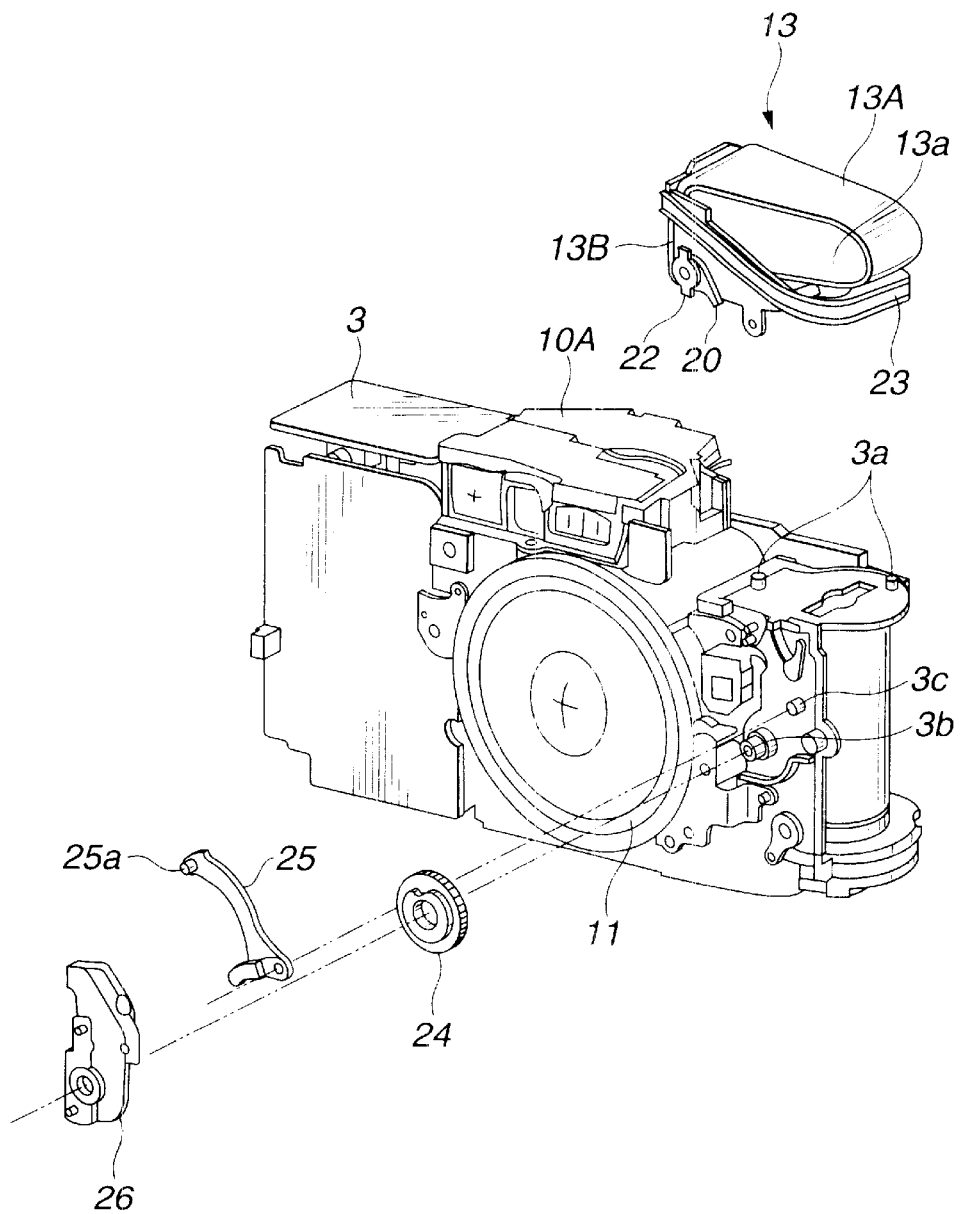
FIG. 3 is a perspective view illustrating the attachment structure of the ST unit and the camera body and a drive-transmission mechanism schematically.

In this embodiment, the ST unit 13 as a third member (a sandwiched member) attached to the camera body 3 is arranged on the upper side of the camera case 2 (see FIG. 3). The ST unit 13 is a pop-up type flash-emitting device which is retracted in the camera case 2 at non-illumination, and is projected for illumination. When the electric source of the camera is turned on, the ST unit 13 is projected to the photographic position, interlocked with the lens barrel 11 being extended to a photographic position, and when the electric source for the camera is turned off, is recovered to the retraction position, interlocked with the lens barrel 11 being collapsed.

Figure 2:
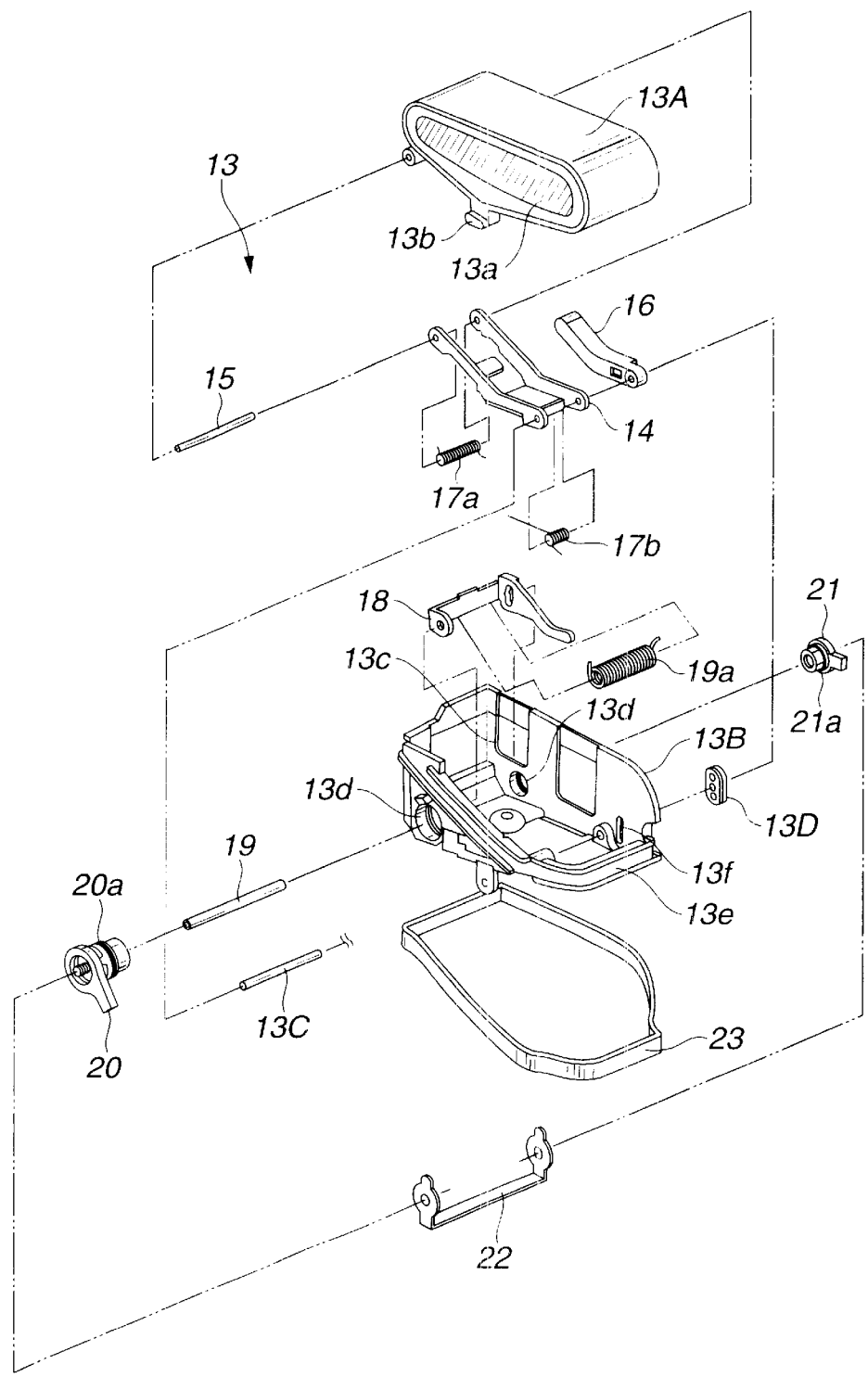
FIG. 2 is an exploded perspective view illustrating the structure of the ST unit shown in FIG. 1.

FIG. 2 is an exploded perspective view showing the structure of the ST unit 13 of the camera 1 shown in FIG. 1.

As shown in FIG. 2, the ST unit 13 comprises as major components an ST case 13A having a light-emitting means such as a light-emitting source, a reflection mirror of an umbrella shape, and so forth mounted inside thereof, an ST body 13B which retracts the ST case 13A and support the ST case 13A movably between the positions of projection and retraction with respect to the camera case 2, an ST rubber 23 which is arranged in a predetermined position on the periphery of the ST body 13B, and functions as a water-proofing means (second water-proofing member) for the inside of the camera case 2 together with the front cover 4 and the back cover 5, and a plurality of drive-transmission members required for pop-up driving.

An ST window 13*a* is formed on the side near a photographic object of the ST case 13A. Moreover, a convex 13*b* for photographically positioning is formed at a predetermined position in the lower end portion on the above-mentioned side of the ST case 13A. When the ST case 13A is projected, the convex 13*b* is engaged with a photographic positioning member 4*b* provided on the front cover 4 so that the ST case 13A can be stopped at a most appropriate position.

A pair of bearings are formed in the lower left portion of the ST case 13A in FIG. 2. With the bearings, the ST case 13A is supported on a ST case shaft 15. The end portions on one side of an ST link 14 are disposed on the opposite sides of the pair of bearings. The ST case 13A and the ST link 14 are rotatably engaged with each other via the ST case shaft 15 and an ST closing spring 17*a*. The ST closing spring 17*a* normally energizes the ST case 13A on the ST case shaft 15 as a rotation axis in the direction in which the ST case 13A is closed.

Moreover, the end portions on the other side of the ST link 14 are rotatably held on bearings formed on both end-portions inside the ST body 13B via an ST link shaft 13C and an ST closing spring 17*b*. The ST closing spring 17*b* normally energizes the ST link 14 in the direction in which the ST link 14 is turned on the ST link shaft 13C as a rotation axis to be closed into the ST body 13B. Moreover, an ST lift 16 is rotatably supported on the ST link shaft 13C at the far side end-portion from a photographic object of the ST link 14. The ST lift 16 is applicable to be engaged with the bottom of the ST case 13A for pop-up of the ST case 13A.

The ST body 13B has a space for receiving the ST case 13A, and also is a case having an opening on one end-portion thereof necessary for the pop-up, formed as shown in FIG. 2. Bearings for supporting the ST link 14 on the ST link shaft 13C are formed on both the sides at one end-portion of the ST body 13B. Moreover, attachment holes 13*d* and 13*d* are formed on both the sides in the other end portion of the ST body 13B.

A second ST cam lever 20 as a drive-transmission member is attached in the attachment hole 13*d* formed on the side near a photographic object of the ST body 13B while the attachment hole 13*d* is sealed with an O ring 20*a*. That is, a water-proofing function for the ST body 13B is attained by the O ring 20*a*.

Furthermore, an ST lever shaft 19 is fixed to the inside of the second ST cam lever 20. The base end-portion of the ST lever shaft 19 is fixed to an ST switch lever 21 via the ST lever 18 engaged with the ST lift 16 and also an ST opening spring 19*a*. The ST switch lever 21 is fitted on the attachment hole 13*d* from the outside of the ST body 13B. For the ST switch lever 21, the attachment hole 13*d* is also sealed with an O ring 21*a*. Accordingly, a water-proofing function for the ST body 13B is attained.

The second ST cam lever 20 and the ST switch lever 21 are fitted into the attachment holes 13*d* and 13*d*, respectively. These drive-transmission members are rotatably mounted to the ST body 13B while an ST pressing member 22 presses both the ends of the shaft protruded from these members.

The ST unit 13 having the above-described structure is a strobe light-emitting means. Accordingly, it is necessary to supply power from a power source in the camera body 3 to a light-emitting unit (not shown) in the ST case 13A. Thus, a lead wire connected to the light-emitting unit (not shown) is passed through the a lead wire rubber 13D fitted into a hole 13*f* formed on one of the sides of the ST case 13B and is connected to a predetermined electric circuit board disposed in the camera body 3.

In this embodiment, the ST unit 13 is attached to the camera body 3 to facilitate the connection through which power for light emission is supplied from the camera body 3 to the ST unit 13 and moreover, simplify the drive-transmission mechanism for pop-up of the ST unit 13.

Moreover, an attachment groove 13*e* into which the ST rubber 23 as a water-proofing means is placed is formed in a predetermined position on the periphery of the ST body 13B. The ST rubber 23 is fitted into the attachment groove 13*e*. The ST rubber 23 functions as a water-proofing means which enables the front and back covers 4 and 5 to obtain a water-proofing function with respect to the inside of the camera case 2.

FIG. 3 is a perspective view showing the attachment structure of the ST unit 13 having the above-described structure and the camera body 3, and the outline of the drive-transmission mechanism.

As shown in FIG. 3, the camera body 3 has members of an optical system, electronic circuit components, and so forth required for photographing, which are attached to the camera body 3. For example, the camera body 3 contains a driving unit (not shown) which carries out the feeding or rewinding of a film charged in the film receiving room (not shown) provided in a predetermined position in the inner rear-portion of the camera body 3, a finder unit 10A fixed on the upper side thereof, the lens barrel 11 fixed on the front side thereof (see FIG. 1), and so forth.

A space for mounting the ST unit 13 is formed in an upper end-portion of the camera body 3. The ST unit 13 is mounted in the space. In this case, a plurality of attachment holes formed in the bottom of the ST case 13A of the ST unit 13 and a plurality of attachment holes 3a formed at the surface of the space of the camera body 3 are screwed so that the ST case 13A is fixed to the camera body 3.

Moreover, a plurality of drive-transmission members are arranged in the camera body 3 under the ST unit 13 mounted to the camera body 3. In particular, a gear shaft 3b supporting an ST cam gear 24 is disposed in a predetermined position on the front side of the camera body 3. The ST cam gear is applicable to be rotated, interlocked with a driving unit (not shown) mounted in the camera. Moreover, the ST cam gear 24 transmits a rotational force, caused by the driving unit, to the drive transmission link mechanism for pop-up of the ST case 13A.

Moreover, an attachment shaft 3c is disposed in the vicinity of the gear shaft 3b. A first ST cam lever 25 is rotatably supported on the attachment shaft 3c. The first ST cam lever 25 is engaged with the cam formed on the ST cam gear 24 and transmits a driving force to the second ST cam lever 20 attached in the lower portion of the ST body 13B. A sliding pin 25a is formed in the tip of the first ST cam lever 25, and is engaged with a protuberance of the second ST cam lever 20 provided on the ST body 13B.

The ST cam gear 24 and the first ST cam lever 25 are mounted to the front side of the camera body 3 by means of an ST pressing member 26 which is applied from the outside of the camera body 3 in such a manner that these drive-transmission members can be rotated.

Thus, in the above-described structure, the ST unit 13 is attached to the camera body 3. Accordingly, connection through which electric power for light emission is supplied from the camera body 3 to the ST unit 13 can be easily performed. Moreover, since the ST unit 13 is arranged in the vicinity of the driving unit in the camera body 3, the drive transmission mechanism for pop-up of the ST case 13A can be simplified.

According to this embodiment, in the ST unit 13 provided on the camera body 3, improvement is made so that the projection and retraction positions can be secured when the ST case 13A is pop-up operated, and the pop-up operation can be performed safely and smoothly. An example of the above-described structure will be described with reference to FIGS. 4 and 5.

Figure 4:
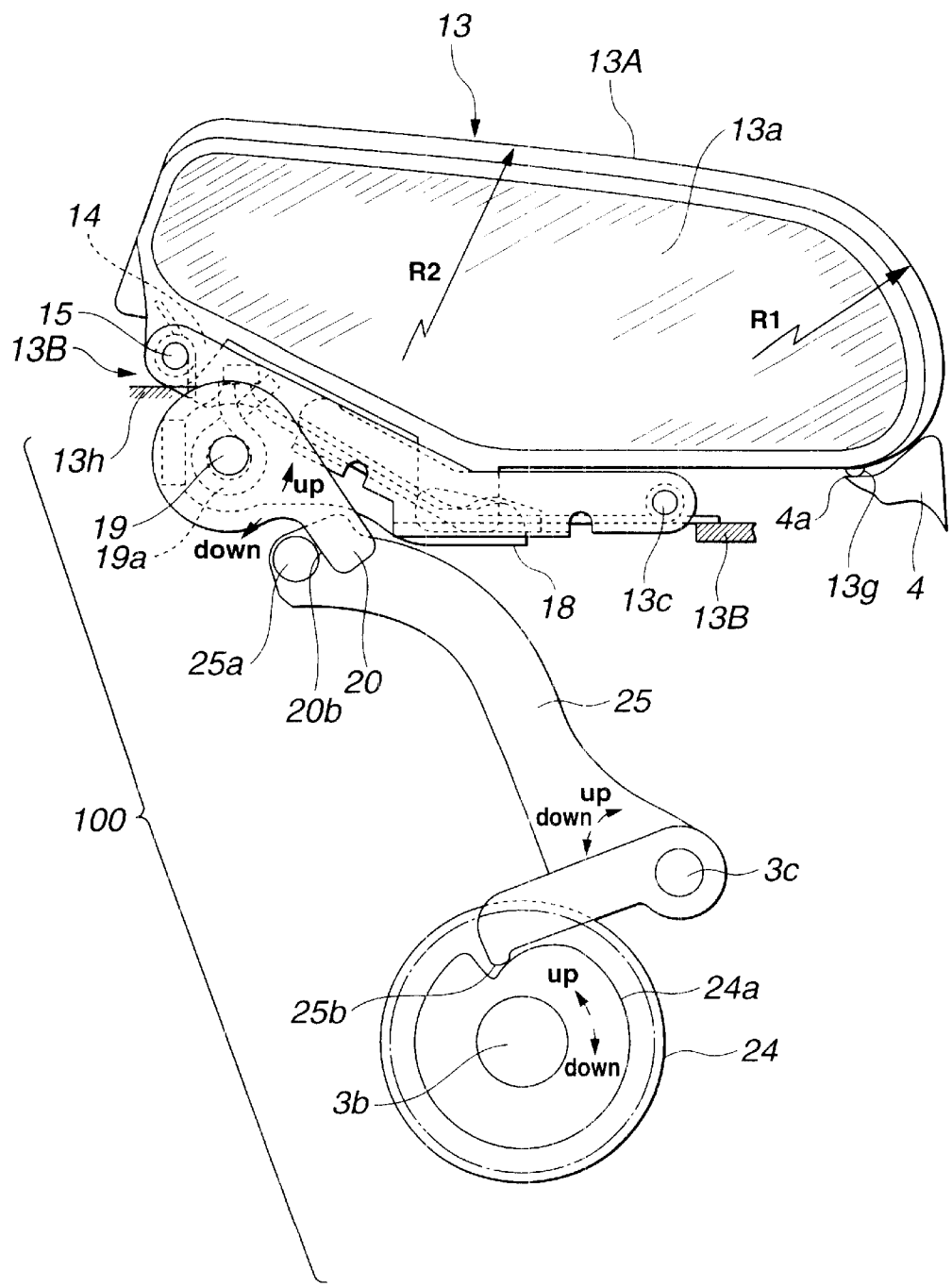
FIG. 4 is an enlarged view showing the essential part of the structure of a drive-transmission link mechanism provided for the ST unit containing a pop-up positioning means when the ST unit is non-pop-up operated.
Figure 5:
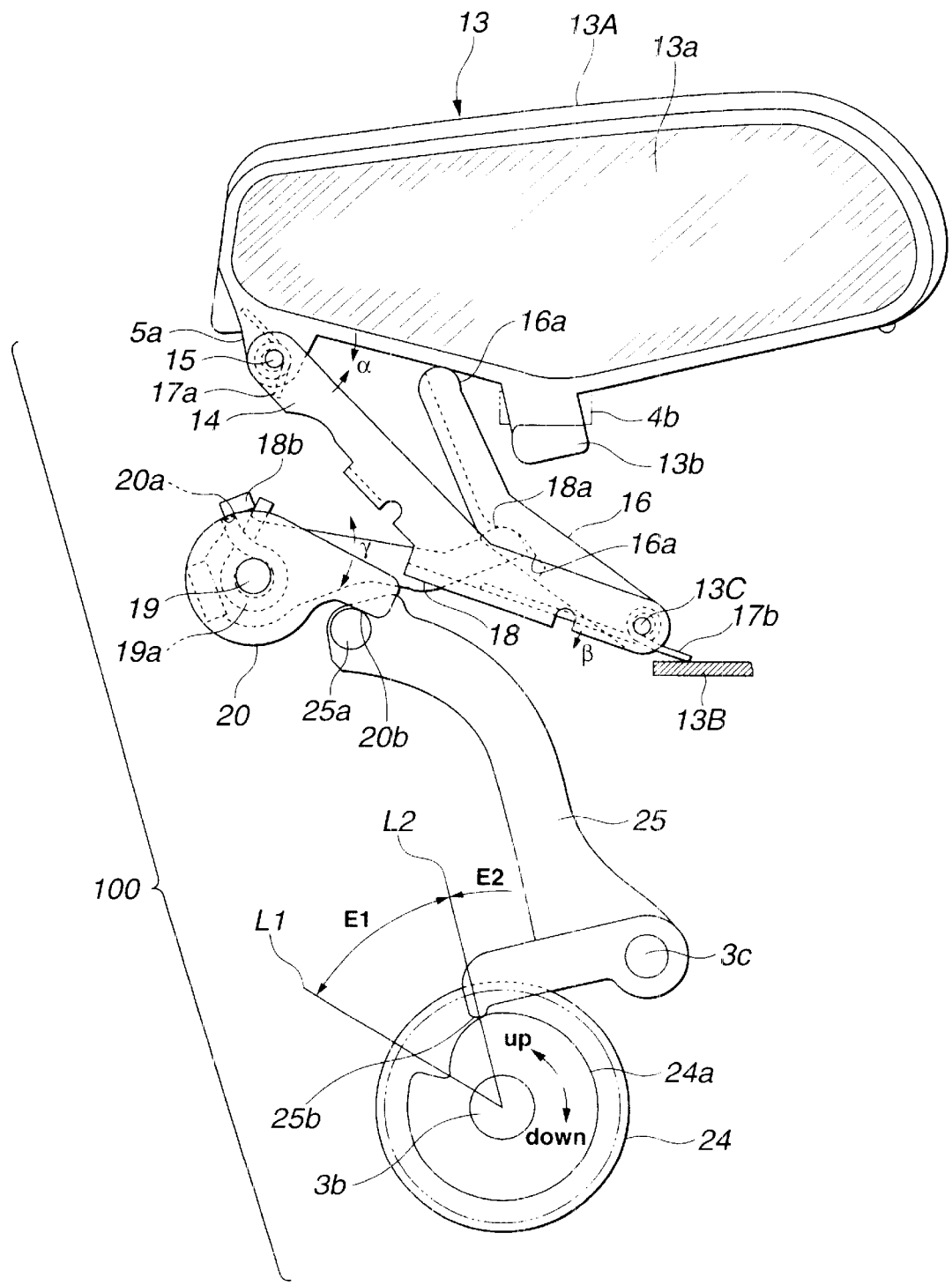
FIG. 5 is an enlarged view showing the essential part of the structure of the drive-transmission link mechanism provided for the ST unit containing the pop-up positioning means when the ST unit is pop-up operated.

FIGS. 4 and 5 are enlarged views showing the essential part of the structure of the drive-transmission link mechanism of the ST unit including the above-described pop-up positioning means. FIG. 4 illustrates the ST case located in the retraction position (non-photographic position). FIG. 5 illustrates the ST case located in the projection position (photographic position).

In this embodiment, characteristically, positioning means for locating the ST case 13A in the projection and retraction positions is provided in the corresponding portion of the front cover 4 so that the projection and retraction positions of the ST case 13A can be secured simply at low costs to perform the pop-up operation, and moreover, the pop-up operation can be carried out safely and smoothly.

In particular, as shown in FIG. 4, a retraction-positioning member 4a for locating the ST case 13A in the retraction position is provided in a predetermined position inside the front cover, while an engagement member 13g comprising two protuberances is formed in the position of the bottom of the ST case 13A corresponding to that of the retraction-positioning member 4a. When the ST case 13A is present in the retraction position, the engagement member 13g on the bottom of the ST case 13A is engaged with the retraction positioning member 4a on the front cover 4. Thus, the retraction position of the ST case 13A is confined and the ST case 13A is positioned.

Moreover, as shown in FIG. 5, a photographic positioning member 4b for locating the ST case 13A in the projection position is provided in a predetermined position inside the front cover 4. When the ST case 13A is placed in the projection position, a photographic positioning convexity 13b provided in the lower portion of the ST case 13A comes into contact with the photographic positioning member 4b. That is, when the ST case 13A is present in the projection position, the photographic positioning convexity 13b is engaged with the photographic positioning member 4b formed on the front cover 4 to be stopped. Thus, the projection position (photographic position) of the ST case 13A is confined and the case 13A is positioned.

Hereinafter, the pop-up drive-transmission operation of the ST unit effectively utilizing these positioning means will be described.

It is assumed that the ST case 13A of the ST unit 13 is present in the retraction position (non-photographic position).

The ST case 13A is rotatably mounted to one end-portion of the ST link 14 by means of the ST case shaft 15 and the ST closing spring 17a. Furthermore, the ST closing spring 17a energizes the ST case 13A so as to rotate on the ST case shaft 15 as a rotation axis in the direction (closing direction) in which the ST case 13A approaches the other end of the ST link 14. Accordingly, as shown in FIG. 4, the engagement member 13g comes into contact with the retraction positioning member 4a of the front cover 4, and thereby, the retraction position (non-photographic position) of the ST case 13A with respect to the front cover 4 can be confined. In addition, an arrow denoted by "α" in FIG. 5 indicates a spring force by the ST closing spring 17a.

The other end of the ST link 14 is rotatably supported on the bearings of the ST body 13B via the ST link shaft 13C and the ST closing spring 17b. Moreover, the ST closing spring 17b normally energizes the ST link 14 in the direction of the bottom of the ST body 13B. Accordingly, as shown in FIG. 4, the ST link 14 is rotated on the ST link shaft 13C as a rotation axis to be retracted in the ST body 13B.

At this time, the engagement member 13g on the bottom of the ST case 13A is engaged with the retraction positioning member 4a of the front cover 4, and thereby, the retraction position of the ST case 13A is confined, by which the case 13A is positioned. In addition, an arrow denoted by "β" in FIG. 5 indicates a spring force by the closing spring 17b.

Moreover, the first cam lever 25 of the pop-up drive-transmission mechanism is energized by the spring forces of the ST closing springs 17a and 17b (the spring forces represented by "α" and "β" in FIG. 5) to be rotated on the attachment shaft 3c in the counterclockwise direction in FIG. 4. At this time, the contact portion 25b of the first ST cam lever 25 contacts the ST drive cam member 24a at an initial position, since the initial position (the most base-end of the cam) in the strobe drive region of the ST drive cam member 24a provided on the outer surface of the ST cam gear 24 interlocked with the driving unit in the camera body 3 is at a rotation position in which the cam member 24a can contact the contact portion 25b of the first ST cam lever 25.

The ST case 13A is normally energized by the spring forces of the ST closing springs 17a and 17b so as to be retracted in the retraction position. Accordingly, the rotation force, caused by the spring forces, is applied to the ST lever 18 and the second ST cam lever 20 on the ST lever shaft 19 as a rotation center in the clockwise direction in FIG. 4. The rotation force is transmitted to the first cam lever 25, since the arm 20b of the second ST cam lever 20 contacts the sliding pin 25a of the first ST cam lever 25. Accordingly, the first cam lever 25 is applied by the rotational force on the attachment shaft 3c as a center in the counterclockwise direction in FIG. 4.

With the above-described structure, the first ST cam lever 25 is rotated on the attachment shaft 3c in the counterclockwise direction, following up the rotation of the ST drive cam member 24a of the ST cam gear 24 from the pop-up position shown in FIG. 5 to the pop-down position shown in FIG. 4. With the rotation of the first ST cam lever 25, the second ST cam lever 20 is rotated on the ST lever shaft 19 in the clockwise direction in FIG. 4.

With the rotation of the second ST cam lever 20, the ST lever 18 supported by means of the second ST cam lever and the ST lever shaft 19 is also rotated on the ST cam lever shaft 19 as a center in the clockwise direction in FIG. 4. That is, the driving portion 18a of the ST lever 18 (see FIG. 5) is rotated in the direction of the bottom of the ST body 13B, and thereby, the ST lift 16 engaged with the diving portion 18a is rotated on the ST link shaft 13C as a rotation axis in the counterclockwise direction in FIG. 5.

Thus, the driving portion 16a formed in the tip of the ST lift 16 is moved sliding on the bottom of the ST case 13A in contact with the driving portion 16a. Thus, the contact of the driving portion 16a with the ST case 13A is released, and simultaneously, the ST case 13A is retracted into the ST body 13B, due to the energizing force caused by the spring forces (the spring force denoted by "α", "β" in FIG. 5) of the ST closing springs 17a and 17b. In this case, since the engagement member 13g on the bottom of the ST case 13A is engaged with the retraction-positioning member 4a of the front cover 4 as described above, the retraction-position of the ST case 13A is confined, by which the ST case 13A is positioned. The state in which the ST case 13A is positioned and retracted, shown in FIG. 4, can be attained.

Then, to move the ST case 13A of the ST unit 13 from the state shown in FIG. 4 to the projection position (photographic position), the pop-up operation is carried out.

With the barrier 4A being moved from the close-position to the open-position, the main switch (not shown) of the camera 1 is turned on, and a motor (not shown) as a drive source is driven and controlled so that the lens barrel 11 is extended from the collapse position in which the lens barrel 11 is retracted in the camera 1 to the "wide" position at which the shortest focal length is presented. Then, the ST cam gear 24, which is connected to a speed-reducing mechanism for transmitting the driving force of the motor to the lens barrel 11, is rotated in the counterclockwise direction (UP direction) in FIG. 4 on the gear shaft 3b as a center.

Accordingly, the first ST cam lever 25 engaged with the cam of the ST drive cam 24a is pushed up, due to the profile or shape of the cam of the ST drive cam member 24a. Thus, the first ST cam lever 25 is rotated on the attachment shaft 3c as a rotation axis by a predetermined distance in the UP direction so as to be set in the pop-up position. With this rotation, a driving pin 25a disposed in the other base-end is rotated in the UP direction, and thereby, the engagement portion of the second ST cam lever 20 mounted under the ST body 13B is pushed up by the driving pin 25a so as to be rotated in the UP direction. In this case, the driving pin 25a is rotated against the energizing forces of the ST closing spring 17a and 17b.

Then, the ST lever 18 supported by the second ST cam lever 20 and the ST lever shaft 19 is also rotated in the UP direction. That is, the driving member 18a of the ST lever 18 (see FIG. 5) is rotated on the ST link shaft 13c as a rotation axis in the UP direction with contacting and pushing up the ST lift 16.

With the rotation of the ST lift 16 in the UP direction as described above, the driving member 16a formed in the tip of the ST lift 16 is moved in the right-hand direction in FIG. 5 with contacting and sliding on the bottom of the ST case 13A and moreover pushing up the ST case 13A. Thereby, the ST link 14 is rotated on the ST link shaft 13C as a rotation axis in the clockwise direction. Moreover, the ST case 13A is rotated on the ST case shaft 15 in the counterclockwise direction. That is, the ST case 13A is projected together with the ST case shaft 15 which is the rotation axis of the ST case 13A, due to the rotation of the ST link 14, and moreover, due to the rotation thereof on the ST case shaft 15, to be displaced to the projection position.

The photographic positioning convexity 13b provided on the lower portion of the ST case 13A is engaged with the photographic retraction-positioning member 4b of the front cover 4 to be stopped. Thus, the projection position (photographic position) of the ST case 13A is confined, and the ST case 13A is positioned to be in the pop-up state as shown in FIG. 5.

Moreover, with the rotation of the second ST cam lever 20, the ST switch lever 21 provided on the back side of the ST body 13B is rotated to operate an ST switch 29 (see FIG. 9A) which detects whether the ST case 13A lies in the projection position or in the retraction position. Thereby, it can be detected whether the ST case 13A lies in the projection position or in the retraction position. Thus, when the ST case 13A lies in the retraction position, photographing in error can be prevented.

The displacement of the ST case 13A from the retraction position to the projection position is carried out while the lens barrel 11 is extended from the collapse position to the "wide" position. Thus, with the opening-operation of the barrier 4A by a photographer, the lens barrel 11 is extended to the "wide" position, and moreover, the ST case 13A is displaced to the projection position. Thus, preparation for photographing is completed.

Moreover, when a photographer operates the zooming-operation button 7 for zooming, the ST cam gear 24 is also rotated during the zooming operation, since the gear 24 is connected to the speed-reduction mechanism for driving the lens barrel. A free running region E2 (zooming area) continuous from a strobe driving region E1 (set-up region) provided in the ST drive cam member 24a is formed to have an arc shape on the gear shaft 3b as a center, so that the first ST cam lever 25 can be kept in the position shown in FIG. 5. Thus, the ST case 13A is also kept in the projection position during zooming. Reference numeral L1 in FIG. 5 designates the initial position of the strobe driving region. Reference numeral L2 denotes the start-position of the free running region E2 (zooming region) corresponding to the up-position (pop-up position) of the ST case 13A.

When the ST case 13A is displaced from the projection position to the retraction position, a photographer closes the barrier 4A, so that the main switch of the camera 1 is turned off. The lens barrel 11 is receded to the collapse position, interlocked with the turn off of the main switch. At this time, the ST cam gear 24 is rotated in the "down" direction. The ST case 13A is retracted to the retraction position by the spring forces of the ST closing springs 17a and 17b as described above.

As described above, the ST opening spring 19a is mounted between the second ST cam lever 20 and the ST cam lever 18 as described above, and energizes the levers 20 and 18 in the direction in which the levers 20 and 18 are opened from each other. By the way, in FIG. 5, a symbol "18b" indicates an engagement member of the ST cam lever 18 to which the base-end of the ST opening spring 19a is engaged, and a symbol "20a" indicates an engagement member of the second ST cam lever 20 to which the other end of the ST cam lever 18 is engaged. Also, an arrow denoted by "γ" indicates a spring force by the ST opening spring 19a.

Thereby, the second ST cam lever 20 and the ST cam lever 18 are integrally rotated in a predetermined loading-range, and when the load exceeds the range, the levers 20 and 18 operate against the energizing force of the ST opening spring 19a, independently of each other. Therefore, when the ST case 13A is driven from the retraction position to the projection position, both of the levers 20 and 18 are integrally rotated to drive the ST case 13A. On the other hand, if a force is applied further to push the ST case 13A from the retraction position to the projection position and so forth when the ST case 13A is present in the projection position, the second ST cam lever 20, which is engaged with the first cam lever 25, can not be rotated, but the ST cam lever 18 can be rotated against the energizing force of the ST opening spring 19a. Thereby, even if an excessive force is applied to the ST case 13A, breaking of the strobe driving mechanism 100 can be prevented.

Hereinafter, locating of the ST case 13A, which is a light-emission section, in the retraction and projection positions will be described. As described above, the ST case 13A is displaced between the retraction and projection positions by two types of rotation, that is, its rotation on the ST case shaft 15 as a rotation axis and also by the rotation of the ST case shaft 15 caused by the rotation of the ST link 14. Therefore, to position the ST case 13A, these two types of rotation are required to be positionally confined.

Figure 8:
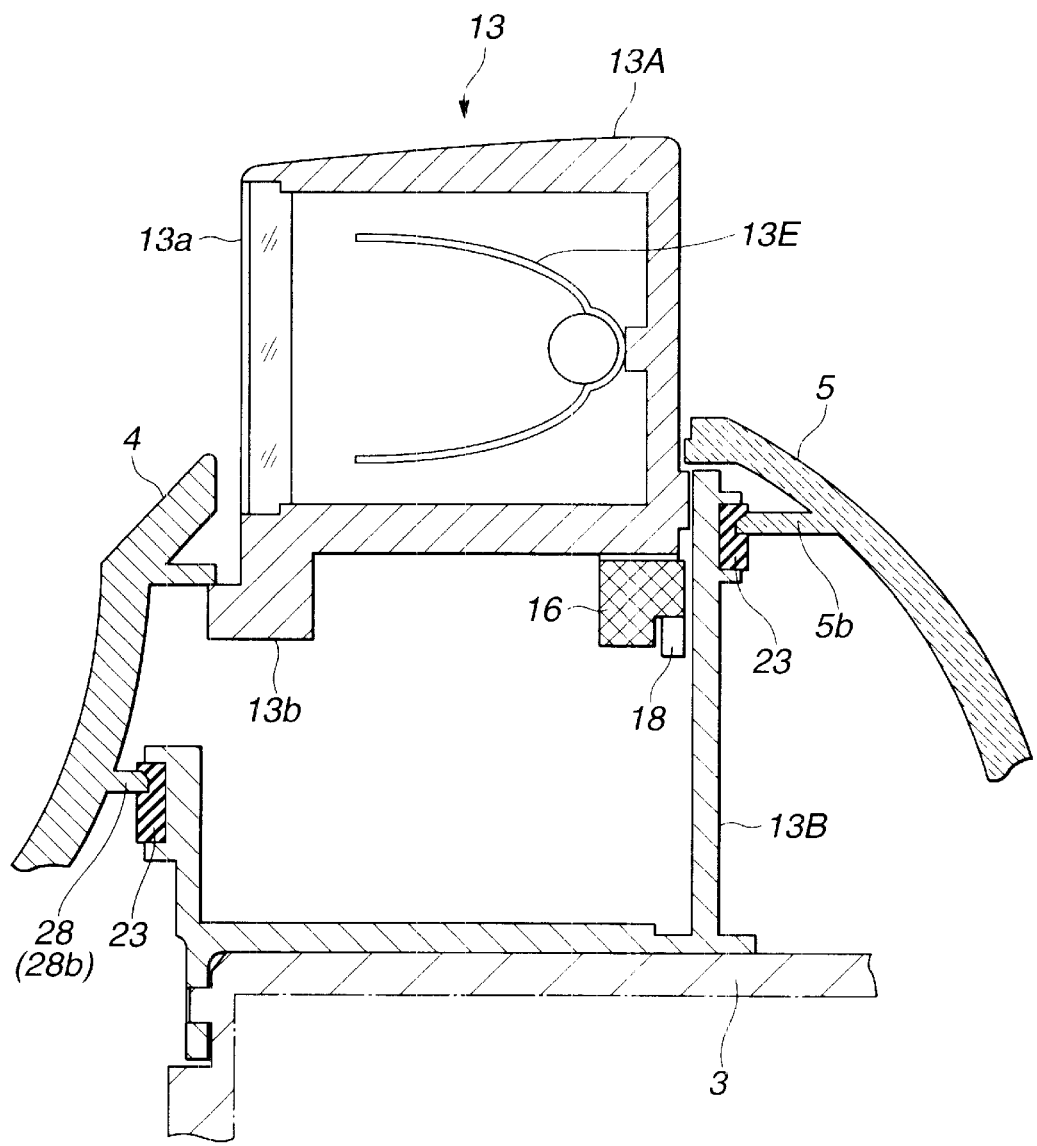
FIG. 8 is a cross-sectional view schematically showing a water-proof structure according to an embodiment of the present invention employed for a camera.

First, referring to the rotation of the ST case 13A on the ST case shaft 15 as a rotation axis into the retraction position as described above, as shown in FIG. 4, the positioning of the ST case 13A is achieved by contacting the engagement member 13g provided on the bottom of the ST case 13A with the retraction-positioning member 4a formed on the front cover 4. Regarding the projection position, as shown in FIGS. 5 and 8, the positioning of the ST case 13A is achieved by contacting the photographic positioning convexity 13b formed on the ST case 13A with the photographic positioning member 4b formed on the front cover 4. Thus, the rotation of the ST case 13A on the ST case shaft 15 as a rotation axis to the retraction position and also the projection position is performed by means of the front cover 4.

Figure 6A:
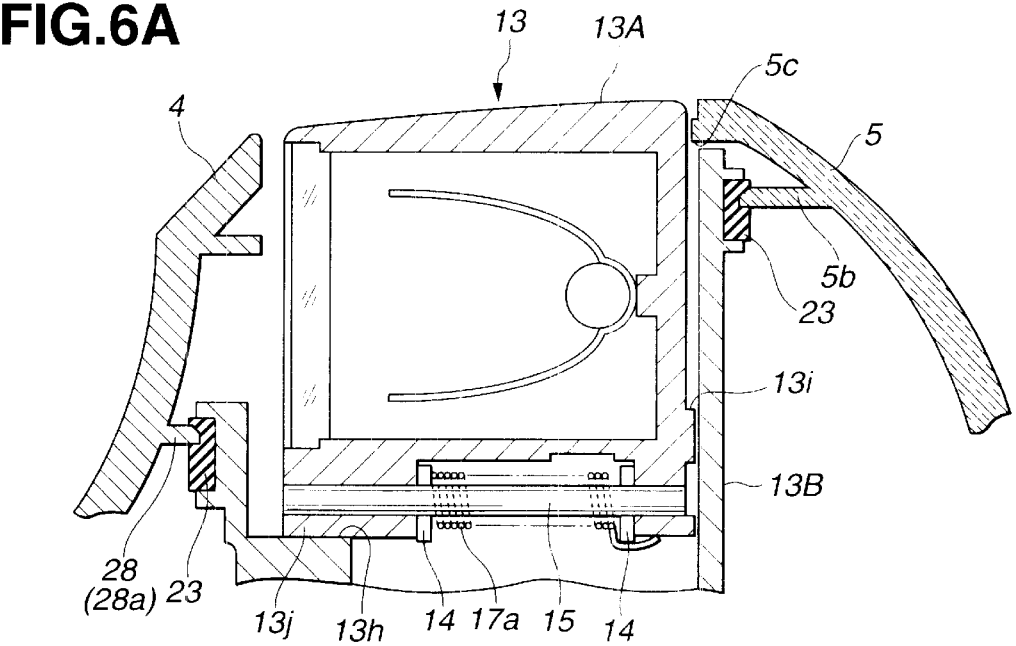
FIG. 6A is a cross-sectional view of a camera provided with another pop-up position-constraining means when the camera is in the non-pop-up position.
Figure 6B:
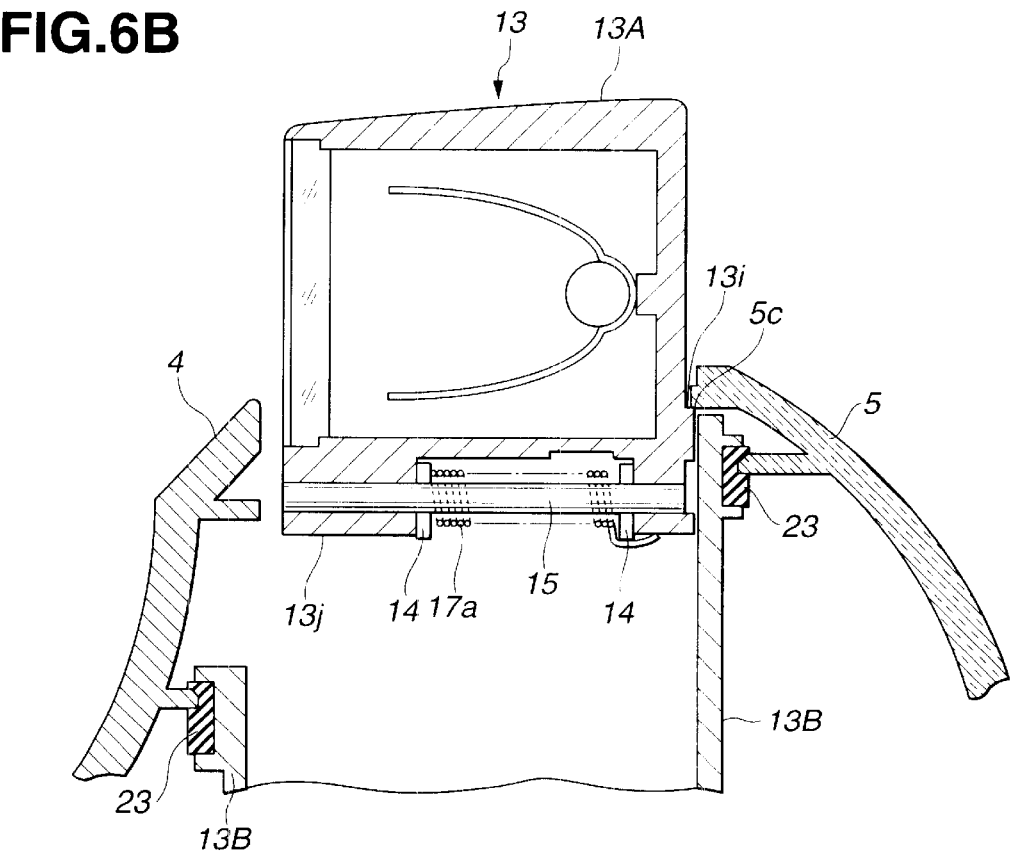
FIG. 6B is a cross-sectional view of the camera provided with the another pop-up position-constraining means when the camera is in the pop-up position.

Hereinafter, the positioning of the ST case 13A on the ST case shaft 15, caused by the rotation of the ST link 14, will be described. In this embodiment, the positioning of the ST case 13A to the retraction position, caused by the rotation of the ST link 14, is performed by means of the ST body 13B. That is, as shown in FIGS. 4, 6A, and 6B, the shaft holes for the ST case shaft 15 of the ST case 13A are provided in the ST body 13B, and moreover, the positioning of the ST case 13A which is moved with the rotation of the ST link 14 is performed by contacting an engagement member 13j as a retraction positioning member with a retraction positioning member 13h provided on the ST body 13B. On the other hand, the positioning of the ST case 13A to the projection position is carried out by contacting a photographic positioning convexity 13i formed on the back side of the ST case 13A with a photographic positioning member 5c provided on the back cover 5.

As described above, in this embodiment, the positioning of the ST case 13A to the projection position is carried out by means of the front cover 4 and the back cover constituting an outer case. Thereby, the ST case 13A can be accurately positioned in the projection position with respect to an external member. Referring to the positioning of the ST case 13A to the retraction position, that of the ST case 13A caused by the movement thereof on the ST case shaft 15 as a rotation axis is achieved by means of the front cover 4, and that of the ST case 13A by the movement thereof caused by the rotation of the ST link 14 is achieved by means of the ST body 13B.

For the movement of the ST case 13A caused by the rotation of the ST link 14, it is necessary to keep an accurate positional relationship among the outer surface (the surface represented by R2 in FIG. 4) of the ST case 13A, the front cover 4, and the back cover 5. However, the curvature of the outer surface of the ST case 13A is larger than that of the tip portion (the surface represented by R1 in FIG. 4) of the ST case 13A. Accordingly, effects of its positional divergence is small compared to those of the tip portion of the ST case 13A. On the other hand, a positional divergence between the front cover 4 and the back cover 5 in the tip portion of the ST case 13A exerts a large influence over the appearance of them, since the curvature R1 is small. Therefore, the positioning in the tip portion of the ST case 13A in which a positional divergence among the ST case 13A, the front cover 4, and the back cover 5 is ready to exert an influence is carried out by means of the front cover 4. The positioning at the outer surface of the ST case 13A in which the positional divergence hardly exerts an influence is carried out by means of the ST body 13B.

Figure 7:
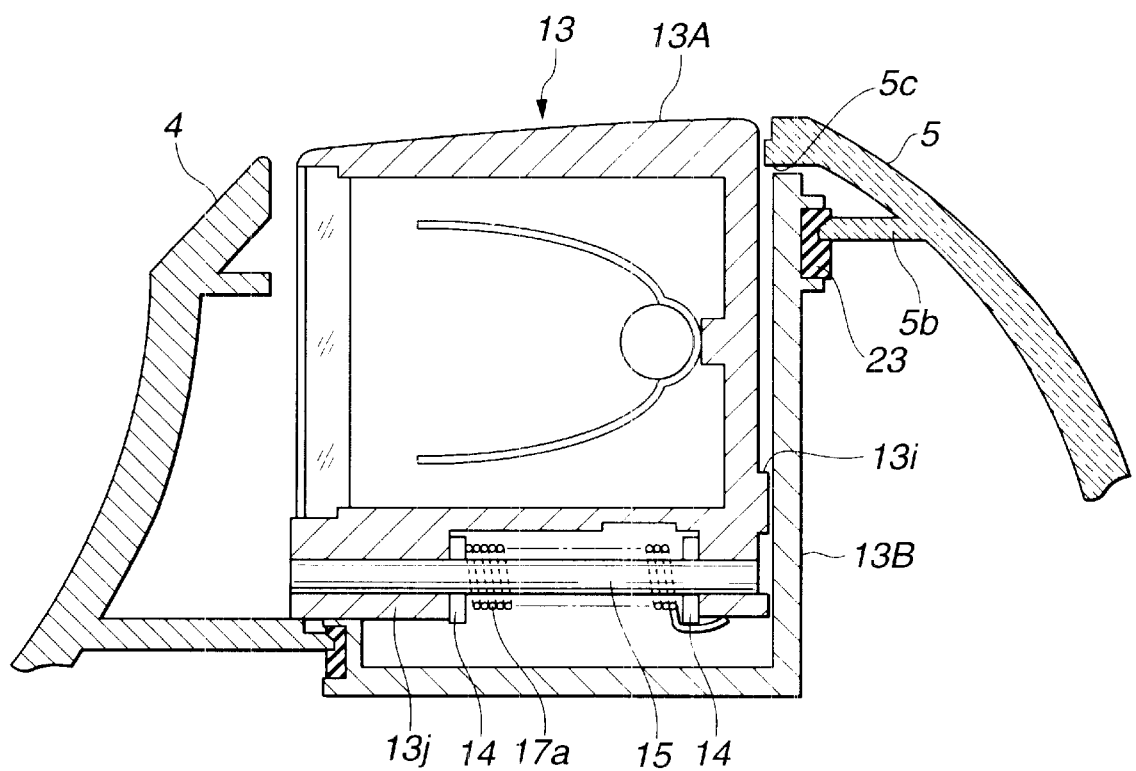
FIG. 7 is a cross-sectional view of a camera provided with still another pop-up position-constraining means when the camera is in the non-pop-up position.

Accordingly, with the above-described structure, needless to say, the assembly of the camera having a pop-up ST unit mounted thereon can be efficiently performed, as shown in FIG. 7. Moreover, with this simple structure, the projection position and the retraction position can be securely set by the pop-up operation of the ST case 13A at low costs. Thus, the pop-up operation can be carried out safely and smoothly.

In the camera 1 having the above-described structure, the pop-up type ST unit 13 is provided on the camera body 3. For water-proof cameras and water-drop-proof cameras each having above-described structure in which the ST unit 13 is simply mounted on the camera body 3, water-proofing functions must be rendered among the front cover 4, the back cover 5, and the ST unit 14 mounted onto the camera body 3, which can be performed with much difficulty.

On the other hand, according to the present invention, the camera has such a structure in which the water-proofing functions among the three members, that is, the front cover 4, the back cover 5, and the strobe unit 13 can be rendered by use of water-proofing members 23 and 30. Thereby, the water-proofing functions between these three members can be securely attained. The water-proof structure of a camera, which is the characteristic of the present invention, will be described in detail with reference to FIGS. 8 to 14.

Figure 10:
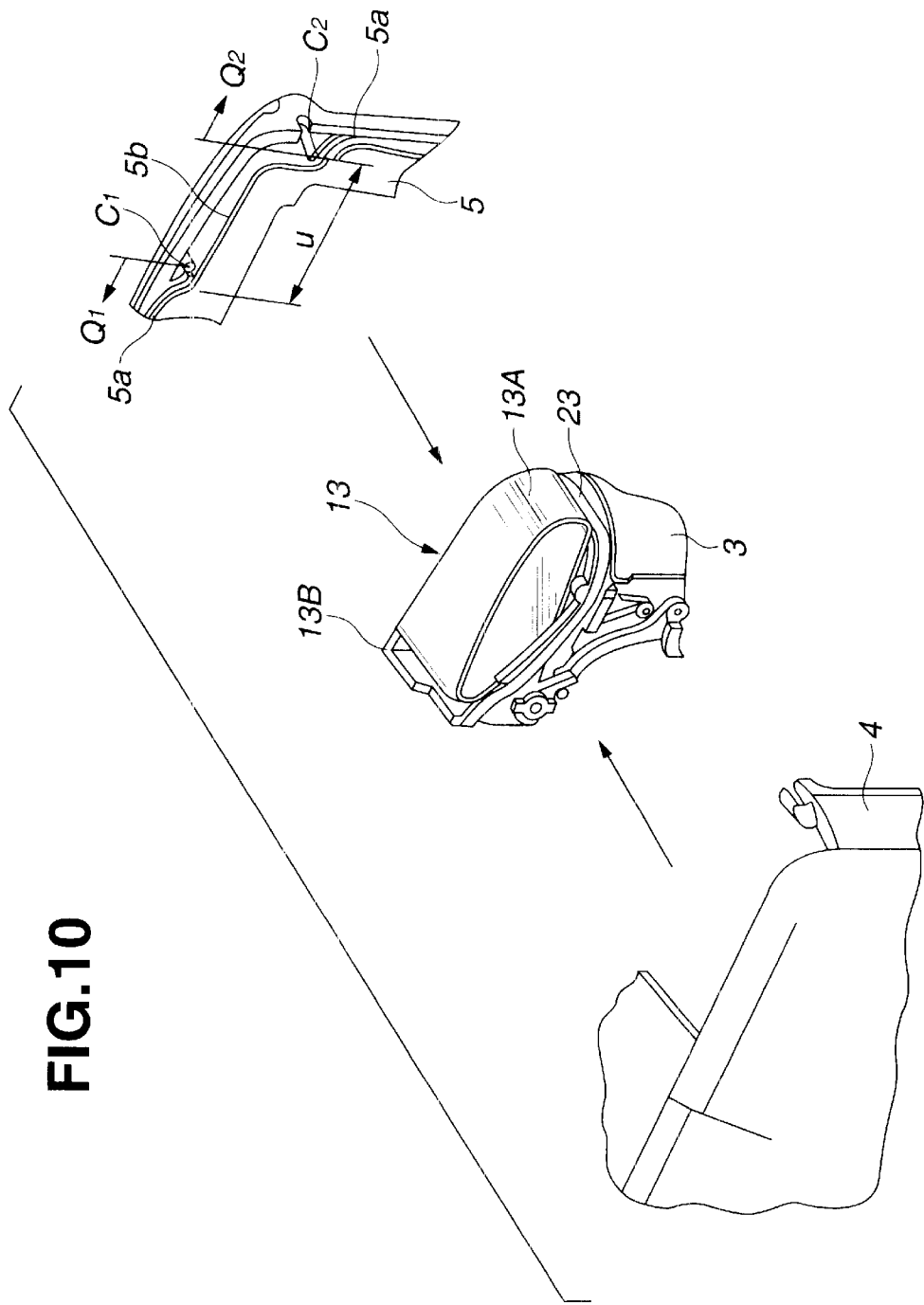
FIG. 10 is a perspective view of the assembly and structure of a camera mainly showing the water-proofing member applied to the back cover.
Figure 11:
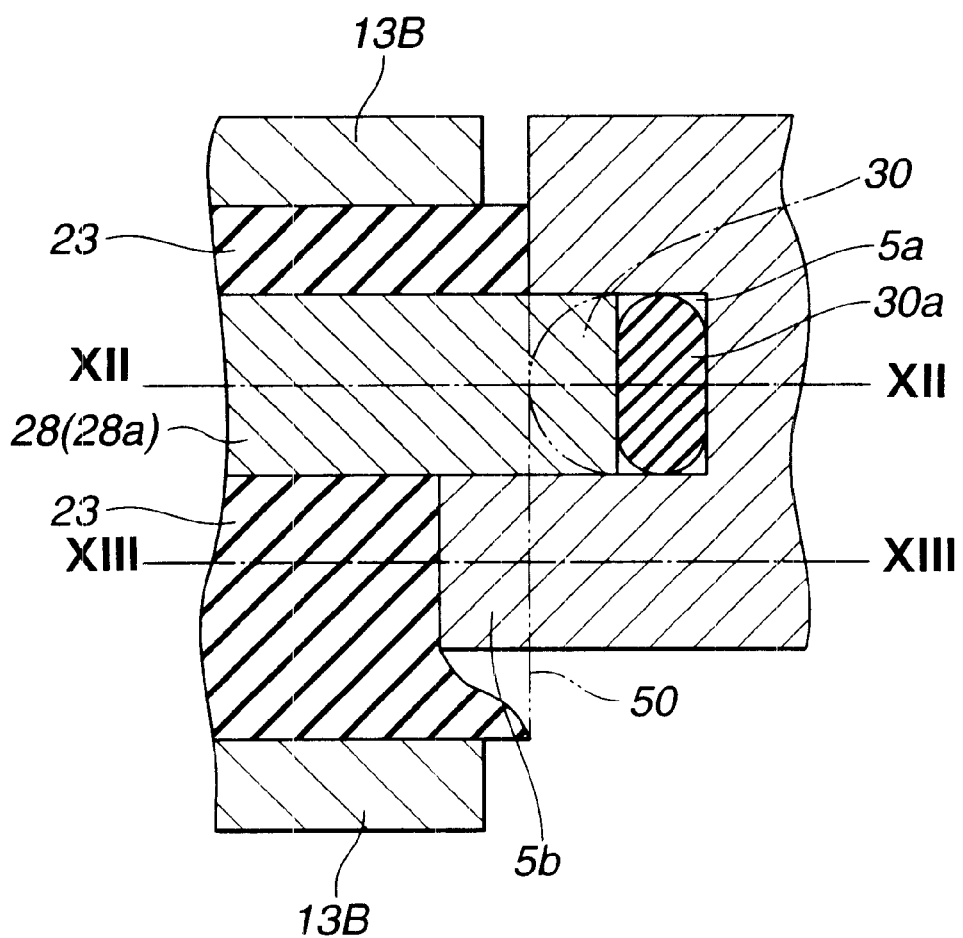
FIG. 11 is a cross sectional view of the camera taken along line XI—XI in FIG. 9A showing the water-proof structure on the periphery of the back cover, the front cover, and the ST body.
Figure 12:
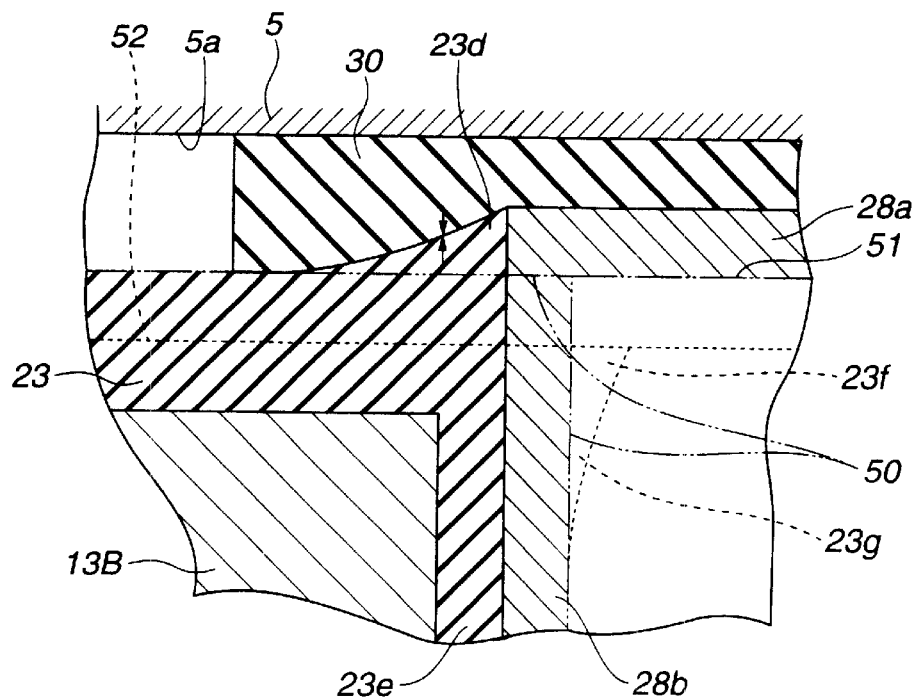
FIG. 12 is a cross-sectional view of the camera taken along line XII—XII in FIG. 11 showing the water-proof structure formed by two water-proofing members provided among the three members, that is, the front cover, the back cover, and the ST body, which is a characteristic of the present embodiment.
Figure 13:
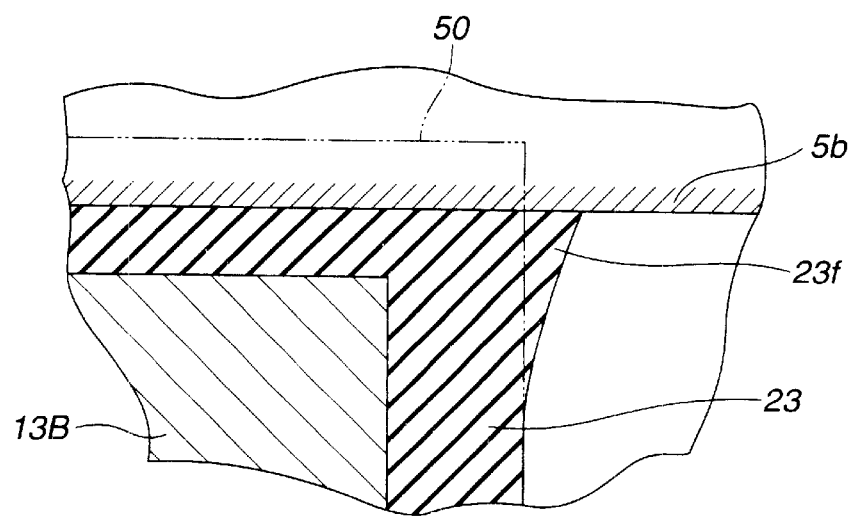
FIG. 13 is a cross-sectional view of the camera taken along line XIII—XIII in FIG. 11 showing the water-proof structure on the periphery of the back cover and the ST body.

FIGS. 8 to 14 show an embodiment of the water-proof structure of a camera in accordance with the present invention. FIG. 8 is a cross-sectional view of the camera showing the constitution of the water-proof structure of the camera. FIGS. 9A and 9B are perspective views showing the structure of a water-proofing means provided mainly for the front cover. FIG. 10 is a perspective view of the assemblage and structure of the camera illustrating the structure of a water-proofing means provided mainly for the back cover. FIG. 11 is a cross-sectional view taken along line XI—XI in FIG. 9A showing a water-proof structure in the peripheral portions of the back cover, the front cover, and the ST body. FIG. 12 is a cross-sectional view taken along line XII—XII in FIG. 11 showing the water-proof structure comprising two water-proofing members among the three members, that is, the front cover, the back cover, and the ST body, which is the characteristic of the present invention. FIG. 13 is a cross-sectional view taken along line XIII—XIII in FIG. 11 showing a water-proof structure in the periphery of the back cover and the ST body. FIGS. 14A and 14B illustrate the shapes of the front cover and the ST body which are improved so that the ST body is assembled more efficiently onto the front cover.

In the water-proof structure of a camera according to this embodiment, the ST body 13 having an ST rubber 23 as a second water-proofing member provided in a predetermined position in the periphery thereof is sandwiched between the front cover 4 and the back cover 5.

A front cover rib 28 (28a, 28b) having a convex shape is formed in the overall periphery on the inside of the front cover 4 and in the position thereof corresponding to the ST rubber 23. That is, in the state in which the ST body 13B is sandwiched between the front cover 4 and the back cover 5, the front cover rib 28 presses the ST rubber 23, so that the front cover 4 and the ST body 13B are kept liquid-tight to each other. Thus, a secured water-proofing function can be attained.

Moreover, a back cover rib 5b having a convex shape is formed in a position inside the back cover 5 corresponding to the ST rubber 23. That is, in the state in which the ST body 13B is sandwiched between the front cover 4 and the back cover 5, the back cover rib 5b presses the ST rubber 23, so that the back cover 5 and the ST body 13B are kept liquid-tight to each other. Thus, a secured water-proofing function can be attained.

FIG. 8 shows the state of the pop-up operated ST case 13A. It is concretely shown that the ST case 13A is located in the projection position (photographic position) by engaging the photographic positioning convexity 13b formed in the lower portion of the ST case 13A with the photographic positioning member 4b of the front cover 4. Moreover, at non-pop-up, the ST case 13A is retracted into the retraction position in the ST body 13B. Thus, with the water-proof structure of a camera according to this embodiment, the water-proofing functions among the ST body 13B, the front cover 4, and the back cover 5 can be securely attained, irrespective of the pop-up operation of the ST case 13A.

In the water-proof structure of a camera of the present invention, further improvement is made to enhance the water-proofing function of the whole of the camera case.

In particular, the camera 1 of this embodiment has the structure in which the ST unit 13 is attached to the camera body 3. Accordingly, to attain a secured water-proofing function, a water-proofing means must be considered for not only the front and back sides of the ST body 13B of the ST unit 13 but also both sides of the ST body 13B.

Accordingly, in this embodiment, the shape and size of the front cover rib of the front cover 4 and that of the back cover rib of the back cover 5 are improved so as to coincide with the ring-shape of the ST rubber 23 of the ST body 13B. Moreover, to keep the front cover 4 and the back cover 5 liquid-tight to each other, a water-proof structure is employed, in which a string-shaped plugged rubber 30 is used as a first water-proofing member for keeping the front cover 4 and the back cover 5 liquid-tight to each other when the back cover 5 and the front cover 4 are joined together, and the front cover rib presses the plugged rubber 30.

FIG. 9A is an assembly and construction view which illustrates the shape of the front cover rib formed on the front cover and that of the ST rubber provided on the ST body. FIG. 9B is an enlarged view of the shape of a characteristic essential part of the ST rubber.

As shown in FIG. 9A, the front cover 4, together with the back cover 5, is used to sandwich the camera body 3. The front cover 4 is provided with an opening through which the ST body 13B attached to a part of the camera body 3 is incorporated into the front cover 4. In the periphery of the opening inside the front cover, a front cover rib 28b is extended so as to coincide with the shape and arrangement of the ST rubber 23 of the ST body 13B to be incorporated. That is, when the ST body 13B is incorporated, the extended front cover rib 28b presses the ST rubber 23 except the part of the rubber 23 provided on the back side of the ST body 13B.

As described above, the front cover rib 28a is provided in the outer periphery of the front cover 4 which is joined to the back cover 5, that is, in the part of the outer periphery of the front cover 4 excluding the part thereof corresponding to the placement of the ST rubber 23 of the ST body 13B. When the front cover 4 is joined to the back cover 5, the front cover rib 28a presses the plugged rubber 30 arranged in the position corresponding to the back cover 4. That is, the front cover rib 28a functions as a rib for the plugged rubber for keeping the front cover 4 and the back cover 5 liquid-tight to each other.

The ST rubber 23 is attached to the back side of the ST body 13B (back side of the camera 1), forming bend portion 23c so that the rubber 23 turns around the outer periphery of the ST body 13B in a predetermined position thereof.

More particularly, as shown in FIG. 9B, the ST rubber 23 contains a first pressing region 23a extending substantially in the direction in which the front cover 4 and the back cover 5 are joined together and a second pressing region 23b extending substantially perpendicularly to the above-mentioned joint direction via the bend portion 23c. That is, the front cover rib 28b extending near the opening of the front cover 4 presses the first pressing region 23a of the ST rubber 23. On the other hand, the back cover rib 5b (see FIG. 10) extending on the inside of the back cover 5 presses the second pressing region 23b.

As shown in FIG. 10, the back cover 5, together with the front cover 4, is used to sandwich the camera body 3. A groove 5a to which the plugged rubber 30 is attached so as to conform to the placement and shape of the front cover rib 28a of the front cover 4 is formed in the part of the outer periphery inside the back cover 4 excluding the predetermined region (region C1 to C2), namely in the range indicated by arrows Q1 and Q2 in FIG. 10. That is, the plugged rubber 30 is attached to this groove 5a, and thereby, when the front cover 4 and the back cover 5 are joined to each other, the front cover rib 28a formed on the front cover 4 presses the plugged rubber 30. Thus, the front cover 4 and the back cover 5 can be kept liquid-tight to each other. Both of the end portions of the plugged rubber 30 are placed perpendicularly to the direction in which the front cover 4 and the back cover 5 are joined to each other so as to be overlaid on the ST rubber 23. Accordingly, the plugged rubber 30 and the ST rubber 23 contact each other under pressure as described later.

The predetermined region is designated by reference numerals C1 and C2 as shown in FIG. 10, namely the range indicated by "u" for the ST rubber in FIG. 10. In the region, the back cover rib 5b which presses the ST rubber 23 arranged on the back side of the ST body 13B as shown in FIG. 8, is extended so as to coincide with the shape of the ST rubber 23. The back cover rib 5b near the region C2 forms the attachment groove 5a, and also has such a height and shape as to protrude with respect to the attachment groove 5a. Thus, the rib 5b near the region C2 presses the second pressing region 23b of the ST rubber 23.

The three members, that is, the front cover 4, the back cover 5, and the camera body 3 having the ST unit 3 attached thereto, each having the above-described water-proof structure, are joined to each other as shown in FIGS. 9A and 10. Thus, the camera 1 provided with the water-proof structure of the present invention is produced.

In this case, referring to the water-proof structure in the periphery of the back cover 5, the front cover 4, and the ST body 13B of the camera 1, the front cover rib 28a provided on the front cover 4 presses the plugged rubber 30 attached into the groove 5a of the back cover 5 as shown in FIG. 11, so that the plugged rubber 30a is deformed as shown in FIG. 11. Thus, the front cover 4 and the back cover 5 are kept liquid-tight to each other, and the water-proof structure is secured.

Simultaneously, the back cover rib 5b extended inside the back cover 5 presses the ST rubber 23 of the ST body 13B. The corresponding ST rubber 23 gets into the compressed state as shown in FIG. 11, so that the back cover 5 and the ST body 13B are kept liquid-tight to each other. Thus, the water-proof structure is secured.

Moreover, referring to the water-proof structure on both sides of the ST body 13B, the ST rubber 23 and the plugged rubber 30 as two water-proofing members applied between the front cover 4, the back cover 5, and the ST body 13B form the secure water-proof structure, as shown in FIG. 12, which is the characteristic of the present invention. That is, in the above-described water-proof structure of the camera, the three members, that is, the front cover 4, the back cover 5, and the ST body 13B are joined together with the ST rubber 23 provided on the ST body 13B and the plugged rubber 30 contacting each other under pressure. Thus, the boundaries among the three members, for which a water-proofing function is rendered with much difficulty according to the prior art, are kept liquid-tight to each other.

In this case, if elastic materials for the ST rubber 23 and the plugged rubber 30 have a relation of the rigidity of the ST rubber 23 >that of the plugged rubber 30, the front cover rib 28b of the front cover 4 presses the ST rubber 23 by the force applied by the front cover 4 when it is joined to the ST body 13B as shown in FIG. 12. Thus, the ST rubber is expanded to the end of the front cover rib 28b, so that an expanded portion 23d and a compressed portion 23e compressed by the front cover rib 28b are formed as shown in FIG. 12. Simultaneously, the expanded portion 23d formed in the ST rubber 23 presses the plugged rubber 30 joined to the ST rubber 23, so that the plugged rubber 30 is compressed nearly to the end of the front cover rib 28. In this embodiment, the ST rubber 23 used as a water-proofing means has a larger size in the width direction than the plugged rubber 30.

Referring to the water-proof structure between the back cover 5 and the ST body 13B, the back cover rib 5b of the back cover 5 presses the ST rubber 23 by the force applied when the back cover 5 is joined to the ST body 13B. Thereby, the ST rubber 23 is expanded on the back cover rib 5b to form an expanded portion 23f, and also, is compressed by the back cover rib 5b to form a compressed portion 23e. In FIGS. 11 to 13, reference numerals 50 and 51 represent the non-compressed state of the ST rubber 23 and that of the plugged rubber 30. Reference numeral 52 represents the end of the back cover rib 5b.

Accordingly, the water-proofing function among the three members, that is, the front cover 4, the back cover 5, and the ST body 13B can be secured by use of a simple constitution and at low costs by employment of the above-described water-proof structure.

Moreover, the water-proof structure of a camera of this embodiment is improved to enhance the efficiency of assembly. FIG. 14 illustrates an example of the improvement.

Figure 14A:
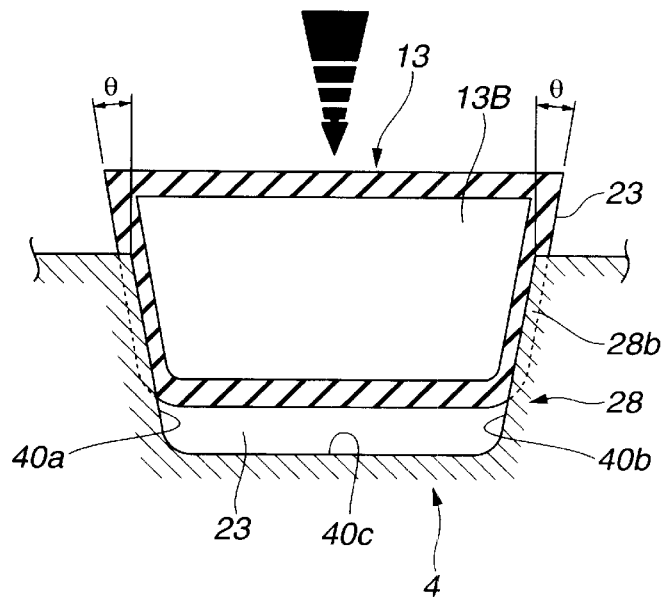
FIG. 14A illustrates the shapes of the front cover and the ST body which are improved to efficiently join the ST body to the front cover, and shows the state in which the ST body 13B is being incorporated through an opening of the front cover 4.
Figure 14B:
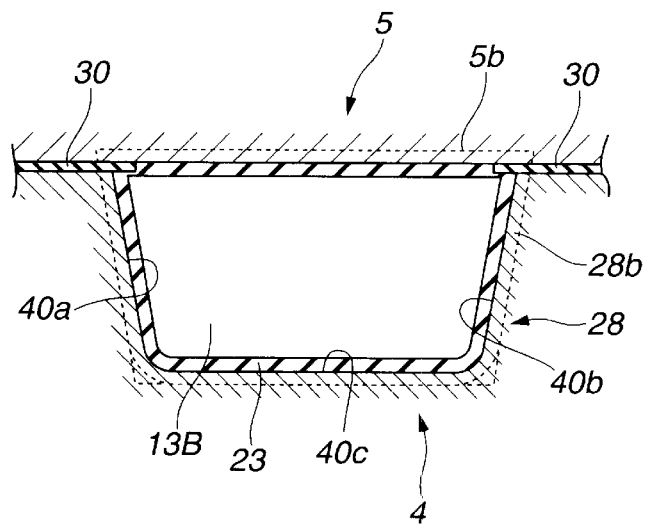
FIG. 14B illustrates the state in which the ST body 13B is completely incorporated through the opening of the front cover.

FIG. 14A shows the state in which the ST body 13B is being joined to the front cover 4 through the opening thereof. FIG. 14B shows the state in which the ST body 13B has been joined to the front cover 4 through the opening thereof.

Referring to the opening of the front cover 4 through which the ST body 13B is joined to the front cover 4 in this embodiment, as shown in FIG. 14A, the front cover rib 28b and the opening are shaped so as to incline at a predetermined angle θ with respect to the joining direction, respectively. Accordingly, both of the side walls 40a and 40b of the opening of the front cover 4 are shaped respectively so as to be spread by the predetermined angle θ to the wall 40c which is the front surface of the front cover 4 and constitutes the opening as shown in FIG. 14A.

According to this embodiment, the ST body 13B is joined to the front cover 4 through the opening. If the opening has such a shape that both the side walls have the same angle to the joining direction, it is difficult to join the ST body 13B to the front cover 4 by pressing the front cover rib 28b against the ST rubber 23 to compress the ST rubber 23 from the standpoint of the workability of the above-described assembly process, since the ST rubber 23 as a water-proofing means is arranged on the periphery of the ST body 13B.

However, according to this embodiment, the opening of the front cover 4 is shaped so as to incline at the predetermined angle θ to the direction in which the ST body 13B is joined to the front cover 4 as described above. Thus, the ST body 13B can be easily placed through the opening to be inserted at starting of the joining.

As shown in FIG. 14A, the ST rubber 23 positioned on both sides of the ST body 13B with respect to the joining direction while the joining is not completed comes into contact with both the side walls of the opening in the final stage of the joining. Thus, the compression of the ST rubber 23 by pressing with the front cover rib 28b can be easily performed, and the joining can be smoothly carried out. Finally, the ST rubber 23 positioning in the front end in the joining direction of the ST body 13B comes into contact with the wall 40c of the opening, and the ST rubber 23 is compressed by the corresponding front cover rib 28.

As described above, the ST body 13B is joined to the front cover 4 through the opening, and furthermore, the back cover 5 is attached. Thus, the periphery of the ST body 13B shown in FIG. 14B is obtained. That is, the water-proof structure in which the ST body 13B, the front cover 4, and the back cover 5 are completely kept liquid-tight to each other can be formed by use of the ST rubber 23 and the plugged rubber 30, which is the characteristic of the present invention.

Thus, the efficiency of the assembly of the camera 1 having the water-proof structure of the present invention can be enhanced.

According to this embodiment, the ST unit 13 is provided on the camera body 3. Needless to say, this enhances the efficiency of the assembly, and also, with the simple structure, the ST case 13A can be securely located at the projection and retraction positions when the pop-up operation of the ST case 13A is carried out at low costs. Moreover, the pop-up operation can be performed safely and smoothly. Thus, the camera 1 provided with the pop-up ST unit 13, which is most suitable for reduction in size, is realized.

Moreover, the water-proof structure among the three members, that is, the front cover 4, the back cover 5, and the ST body 13B contains the ST rubber 23 and the plugged rubber 30 used as water-proofing members. Thus, the water-proofing function among these three members can be securely executed. Thereby, the pop-up camera 1 in which invasion of water such as rain or the like into the camera body 3 is prevented, and the photographic performances are stabilized can be realized.

It should be noted that in the embodiment of the present invention, the camera may be an electronic camera such as a digital camera excluding a single-lens reflex camera and a silver-halide camera. It is obvious that the same advantages as described above can be obtained, provided that the camera having a pop-up ST unit employs the pop-up drive-transmission mechanism and the water-proof structure.

In this invention, it is apparent that various modifications different in a wide range can be made on this basis of this invention without departing from the sprit and scope of the invention. This invention is not restricted by any specific embodiment except being limited by the appended claims.

What is claimed is:

1. A water-proof structure comprising:
   a front cover adapted to cover a front side of a camera body;
   a back cover adapted to cover a back side of the camera body;
   a sandwiched member adapted to be sandwiched between the front cover and the back cover;
   a first water-proofing member that is: (i) arranged on the back cover, and (ii) pressed by a first protuberant strip provided on the front cover in a state in which the front cover and the back cover are joined to each other whereby the front cover and the back cover are kept liquid-tight to each other; and
   a second water-proofing member that is: (i) arranged on the sandwiched member, (ii) pressed by the first protuberant strip whereby the front cover and the sandwiched member are kept liquid-tight to each other, and (iii) pressed by a second protuberant strip provided on the back cover whereby the back cover and the sandwiched member are kept liquid-tight to each other, in a state in which the sandwiched member is sandwiched between the front cover and the back cover.

2. A water-proof structure according to claim 1, wherein the second water-proofing member has a larger size than the first water-proofing member in a width direction perpendicular to a direction in which the second water-proofing member is pressed by the first and second protuberant strips.

3. A water-proof structure according to claim 2, wherein the second water-proofing member comprises a bent portion that turns around a periphery of the sandwiched member, a first pressed portion extending from the bent portion in a direction in which the front cover and the back cover are joined to each other, and a second pressed portion extending substantially perpendicularly to the direction of joining, and wherein the first pressed portion is pressed by the first protuberant strip, and the second pressed portion is pressed by the second protuberant strip.

4. A water-proof structure according to claim 3, wherein the first pressed portion and the second pressed portion are provided at different positions in a width direction of the second water-proofing member.

5. A water-proof structure according to claim 1, wherein the first and second water-proofing members comprise elastic members, respectively, and a rigidity of the second water-proofing member is larger than a rigidity of the first water-proofing member.

6. A water-proof structure according to claim 1, wherein the sandwiched member comprises a strobe unit for illuminating a photographic object.

7. A water-proof structure comprising:
   a first case having an open end for joining and a first protuberant strip provided on the open end;
   a second case adapted to be joined to the first case;
   a sandwiched member adapted to be sandwiched between the first and second cases;
   a first water-proofing member arranged on the second case and pressed by the first protuberant strip in a state in which the first and second cases are joined to each other; and
   a second water-proofing member arranged on the sandwiched member and pressed by the first protuberant strip and a second protuberant strip provided on the second case in a state in which the sandwiched member is sandwiched between the first and second cases.

8. A water-proof structure according to claim 7, wherein the second water-proofing member has a larger size than the first water-proofing member in a width direction perpendicular to a direction in which the second water-proofing member is pressed by the first and second protuberant strips.

9. A water-proof structure according to claim 8, wherein the second water-proofing member comprises a bent portion that turns around a periphery of the sandwiched member, a first pressed portion extending from the bent portion in a direction in which the first case and the second case are joined to each other, and a second pressed portion extending substantially perpendicularly to the direction of joining, and wherein the first pressed portion is pressed by the first protuberant strip, and the second pressed portion is pressed by the second protuberant strip.

10. A water-proof structure according to claim 9, wherein the first pressed portion and the second pressed portion are provided at different positions in a width direction of the second water-proofing member.

11. A water-proof structure according to claim 7, wherein the first and second water-proofing members comprise elastic member, respectively, and a rigidity of the second water-proofing member is larger than a rigidity of the first water-proofing member.

12. A water-proof structure according to claim 7, wherein the sandwiched member comprises a strobe unit for illuminating a photographic object.

13. A water-proof structure comprising:
   a first case having an open end and a first protuberant strip formed on an entire periphery of the open end;
   a second case adapted to be joined to the first case;
   a sandwiched member adapted to be sandwiched between the first and second cases;
   a groove formed on the second case and positioned so as to avoid overlapping the sandwiched member;
   a first water-proofing member having a string-shape for keeping the first case and the second case liquid-tight to each other and arranged in the groove, in a state in which the first and second cases are joined to each other;

a second water-proofing member having a ring-shape, turned around a periphery of the sandwiched member, and pressed from three directions by the first protuberant strip on the periphery of the sandwiched member, in a state in which the sandwiched member is sandwiched between the first and second cases; and a second protuberant strip provided on the second case and pressing the second water-proofing member in a direction different from the three directions, wherein a gap between the first and second cases is filled with the first water-proofing member to become water-tight, a gap between the first case and the sandwiched member is filled with the second water-proofing member to become water-tight, and a gap between the second case and the sandwiched member is filled with the second water-proofing member to become water-tight.

14. A water-proof structure according to claim 13, wherein both ends of the first water-proofing member are lapped over the second water-proofing member perpendicularly to a direction in which the first and second cases are joined to each other.

15. A water-proof structure according to claim 13, wherein the sandwiched member has a substantially quadrangular shape having four sides, the first protuberant strip presses three of the four sides of the quadrangular shape, and the second protuberant strip presses the fourth side of the quadrangular shape.

16. A water-proof structure according to claim 15, wherein two sides of the sandwiched member substantially parallel to a direction in which the first and second cases are joined to each other incline in a predetermined amount to the direction of joining.

17. A water-proof structure according to claim 13, wherein the second water-proofing member comprises a bent portion, a first pressed portion extending from the bent portion in a direction in which the first case and the second case are joined to each other, and a second pressed portion extending substantially perpendicularly to the direction of joining, and wherein the first pressed portion is pressed by the first protuberant strip, and the second pressed portion is pressed by the second protuberant strip.

18. A water-proof structure according to claim 17, wherein the second water-proofing member has a larger size than the first water-proofing member in a width direction perpendicular to a direction in which the second water-proofing member is pressed by the first and second protuberant strips, and the first pressed portion and the second pressed portions are located at different positions in a width direction of the second water-proofing member.

19. A water-proof structure according to claim 13, wherein the second protuberant strip is formed by protruding a wall surface having the groove formed thereon.

20. A water-proof structure according to claim 13, wherein the first water-proofing member and the second water-proofing member are pressed by the first and second protuberant strips, so that both ends of the first water-proofing member come into contact with the second water-proofing member.

21. A water-proof structure according to claim 13, wherein the sandwiched member comprises a strobe unit.

22. A water-proof structure according to claim 21, wherein the strobe unit comprises a base stand and a light-emitting section supported in such a manner that the light-emitting section can be retracted into and can be projected from the base stand, and wherein the second water-proofing member is arranged on the base stand.

* * * * *